United States Patent
Ogawa et al.

(10) Patent No.: US 7,011,412 B2
(45) Date of Patent: Mar. 14, 2006

(54) POLARIZATION CONVERTER, AN ILLUMINATION OPTICAL DEVICE HAVING THE POLARIZATION CONVERTER AND PROJECTOR

(75) Inventors: Yasunori Ogawa, Suwa (JP); Fumie Kawai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 118 days.

(21) Appl. No.: 10/397,868

(22) Filed: Mar. 27, 2003

(65) Prior Publication Data

US 2003/0197937 A1 Oct. 23, 2003

(30) Foreign Application Priority Data

Mar. 28, 2002 (JP) ......................... 2002-092797

(51) Int. Cl.
*G03B 21/14* (2006.01)
*G03B 21/28* (2006.01)

(52) U.S. Cl. .......................... 353/20; 353/81
(58) Field of Classification Search ................... 353/20, 353/81, 98; 359/488, 495; 349/9
See application file for complete search history.

(56) References Cited

U.S. PATENT DOCUMENTS

| | | | |
|---|---|---|---|
| 5,381,278 A | * | 1/1995 | Shingaki et al. .............. 353/20 |
| 5,729,306 A | | 3/1998 | Miyake et al. ................. 349/9 |
| 6,394,607 B1 | | 5/2002 | Hashizume et al. .......... 353/20 |
| 6,497,488 B1 | * | 12/2002 | Yamauchi et al. ............ 353/20 |
| 6,623,129 B1 | * | 9/2003 | Fujimori ....................... 353/20 |
| 6,726,328 B1 | * | 4/2004 | Lee .............................. 353/20 |

FOREIGN PATENT DOCUMENTS

| | | |
|---|---|---|
| CN | 1181815 | 5/1998 |
| WO | WO 9734173 | 9/1997 |

* cited by examiner

*Primary Examiner*—Christopher E Mahoney
(74) *Attorney, Agent, or Firm*—Oliff & Berridge, PLC

(57) ABSTRACT

A polarizing conversion element array (500) of a polarization converter (414) has two polarizing conversion elements (510) provided with a polarization separating film (511) for separating a light beam into two linearly polarization beams and a reflecting film (512) that reflects one of the linearly polarization beams separated by the polarization separating film (511) in an alternate manner, the two polarizing conversion elements (510) being arranged so that the respective polarization separating films (511) and the reflecting films (512) are opposed, the polarization converter (414) being constructed by adhering a retardation plate (600) on a light-irradiation side of the polarizing conversion element array (500) stretching over the two polarizing conversion elements (510).

5 Claims, 17 Drawing Sheets

US 7,011,412 B2

POLARIZATION CONVERTER, AN ILLUMINATION OPTICAL DEVICE HAVING THE POLARIZATION CONVERTER AND PROJECTOR

BACKGROUND OF THE INVENTION

1. Field of the Invention

The present invention relates to a polarization converter for converting a light beam from a light source into a single linearly polarization beam, an illumination optical device having the polarization converter and a projector.

2. Description of Related Art

Conventionally, a projector has been used for presentation at a conference, academic society and exhibition. Such projector accommodates a plurality of optical components in a casing, where a light bean irradiated by a light source is enlarged and projected after being modulated by the light components to form a projection image.

A polarization converter for converting the light beam from the light source into a single linearly polarization beam is used for enhancing utilization efficiency of the light beam to obtain a bright projection image.

The polarization converter has a polarizing conversion element having a polarization separating film inclined relative to incident light beam for separating the light beam from the light source into two linearly polarization beam (separates into two linearly polarization beam by transmitting and reflecting the light beam), a reflecting film for reflecting one of the separated linearly polarization beams (linearly polarization beam reflected by the polarization separating film) separated by the polarization separating film and a light-transmissive member interposed between the polarization separating so that a plurality of the polarization separating films and the reflecting films are alternately arranged, and a retardation plate attached to light-irradiation side of the polarizing conversion element.

Such polarization converter has an ineffective area, where the light beam is directly incident on the reflecting film without passing through the polarization separating film to be irradiated as ineffective polarization light.

Especially, since the light beam from the light source has the highest luminance at the central position (illumination optical axis), which is gradually lowered in accordance with the distance from the central position, considering such characteristics of the light source, the polarization converter has a pair of polarizing conversion elements spaced apart with each other at a predetermined gap and located so that the corresponding polarization separating films and the reflecting films are opposed In other words, the par of polarizing conversion elements are located spaced apart with a predetermined gap sandwiching the illumination optical axis of the light source.

According to the above arrangement of the polarization converter, the light beam passing through the gap between the pair of polarizing conversion elements (i.e. through the central position) is a random polarization light including effective polarization light, thus improving utilization efficiency of the light beam.

In the polarization converter having the pair of polarizing conversion elements, the respective polarization separating films are inclined from opposing sides of the pair of polarizing conversion elements approximately in reverse V-shaped cross section and the reflecting films are disposed in parallel to the inclined polarization separating film with a predetermined interval, the polarization separating films and the reflecting films being alternately and consecutively arranged. The retardation plate is attached to an end of the light-irradiation side of the polarizing conversion element in accordance with the pitch of the polarization separating film.

Recently, high luminance has come to be required for a projector and further improvement in light utilization efficiency is desired.

The luminance of the projector may be enhanced by reducing the gap between the pair of polarizing conversion elements of the polarization converter and converting the random polarization light passing through the gap between the pair of polarizing conversion elements (illumination optical axis) into a single effective polarization light However, according to the above polarization converter, the retardation plates attached to opposing sides of the pair of polarizing conversion elements interferes with each other when the gap between the pair of polarizing conversion elements is diminished.

In order to avoid the interference, the attachment accuracy of the retardation plate has to be more strictly set, thus complicating the production process of the polarization converter.

SUMMARY OF THE INVENTION

An object of the present invention is to provide a polarization converter capable of enhancing luminance of a projector, simplifying structure and reducing the number of production process, an illumination optical device having the polarization converter and a projector.

A polarization converter according to an aspect of the present invention has: a plurality of polarization separating films inclined relative to incident light beam, the polarization separating films separating the incident light beam into two linearly polarization beams; a plurality of reflecting films alternately disposed in parallel between the polarization separating films, the reflecting films reflecting one of the linearly polarization beams separated by the polarization separating film; a light-transmissive member provided with the polarization separating film and the reflecting film; a plurality of retardation plates provided on a light-irradiation side of the light-transmissive member, the retardation plates converting the polarization axis of the one of the polarization lights; and a pair of polarizing conversion elements, the polarizing conversion elements being combined so that the polarization separating films and the reflecting films of the polarizing conversion elements are symmetrically arranged around a contact surface of the polarizing conversion elements, the retardation plate being provided on a position where the pair of polarizing conversion elements are in close contact and the retardation plate stretches over the pair of polarizing conversion elements.

According to the above aspect of the present invention, since the polarization converter has a pair of polarizing conversion elements and the pair of polarizing conversion elements are combined so that the polarization separating films and the reflecting films of the polarizing conversion elements are symmetrically arranged around the contact surface of the polarizing conversion elements, the random polarization light passing between the pair of polarizing conversion elements (illumination optical axis) can be converted into effective polarization light, thereby enhancing the luminance of the projector.

Further, since the retardation plate stretches over the contact portion of the pair of the polarizing conversion elements, there is no interference between the retardation plates usually caused when a pair of polarizing conversion elements are closely contacted, so that it is not necessary to strictly set the attachment accuracy of the retardation plate.

Further, since the retardation plate stretches over the contact portion of the pair of polarizing conversion elements, the number of the retardation plate attached to the pair of polarizing conversion elements can be reduced, thus reducing the production process in manufacturing the polarization converter.

Accordingly, the structure of the polarization converter can be simplified while enhancing the luminance of the projector and the number of production step can be reduced in manufacturing the polarization converter, thereby attaining an object of the present invention.

Incidentally, the pair of polarizing conversion elements of the above polarization converter may be integrated by bonding with an adhesive etc.

In the polarization converter according to the above aspect of the present invention, the contact surface of the pair of polarizing conversion elements may preferably be located so that the polarization separating films of the respective polarizing conversion elements continuously extend.

According to the above arrangement, since the polarization separating films continuously extend when the pair of polarizing conversion elements are in close contact, the light beam on the illumination optical axis having especially strong luminous energy can be securely converted into a single linearly polarization beam, thus greatly enhancing light utilization efficiency.

In the polarization converter according to the above aspect of the present invention, a notch may preferably be formed on the light-irradiation side along the contact surface of the pair of polarizing conversion elements.

A normal polarizing conversion element is constructed by alternately adhering a sheet glass provided with the polarization separating film and the reflecting film on both sides and a sheet glass having no film thereon with an adhesive so that the polarization separating film and the reflecting film are alternately arranged, cutting the bonded glass in parallel at a predetermined angle relative to the surface thereof and cutting both ends to shape in approximately rectangular parallelepiped.

When two polarizing conversion elements are brought into close contact, a step is likely to be generated on account of difference of the surface positions of the polarizing conversion elements. When the retardation plate is adhered stretching over the pair of polarizing conversion elements with the step being formed, attachment accuracy is deteriorated and transitivity of the light beam irradiated by the polarization converter is deteriorated at the step portion.

In the above arrangement, since the notch is formed on the light-irradiation side of the polarization converter along the contact surface of the pair of polarizing conversion elements, even when the retardation plate is attached sketching over the pair of polarizing conversion elements while the surface position of the two polarizing conversion elements differ, deterioration of attachment accuracy of the retardation plate can be prevented, thus avoiding deterioration of transmissivity in accordance with deterioration of the attachment accuracy.

Accordingly, since the notch is formed along the contact surface, it is not necessary to strictly set the attachment accuracy of the retardation plate while enhancing light utilization efficiency by closely contacting the pair of polarizing conversion elements.

In the polarization converter according to the above aspect of the present invention, the polarization film and the reflecting film may preferably be inclined approximately at forty-five degrees relative to light-incident direction and may preferably be alternately arranged at a predetermined interval.

According to the above arrangement, since the polarization film and the reflecting film are inclined approximately at forty-five degrees relative to light-incident direction and are alternately arranged at a predetermined interval, it is not necessary to unnecessary enlarge the ineffective area generating a linearly polarization beam having polarization axis different from the necessary linearly polarization beam, thereby producing the polarizing conversion element under optimum condition.

An illumination optical device according to another aspect of the present invention has: a light source; a light splitting element that splits a light beam from the light source into a plurality of areas; and the above polarization converter of the present invention.

According to the above aspect of the present invention, since the above polarization converter is provided, an object of the present invention can be achieved as described above and the other advantages can be attained in the same manner.

Further, by using the above polarization converter, the light beam irradiated by the illumination optical device can be converted into approximately single linearly polarization beam.

A projector according to still another aspect of the present invention has: the above illumination optical device; a plurality of optical modulators that modulates the light beam irradiated by the illumination optical device in accordance with image information; and a color combining optical device that combines the light beam modulated by the plurality of optical modulators.

According to the above projector of the present invention, since the above illumination optical device is provided, an object of the present invention can be achieved as described above and the other advantages can be attained in the same manner. Further, by using the above illumination optical device, approximately a single linearly polarization beam can be irradiated on the optical modulator such as a liquid crystal panel, thereby enhancing light utilization efficiency and vividly displaying the image projected by the projector.

DETAILED DESCRIPTION OF PREFERRED EMBODIMENT(S)

An embodiment of the present invention will be descried below with reference to attached drawings.

[1. Primary Arrangement of Projector]

Figure 1:
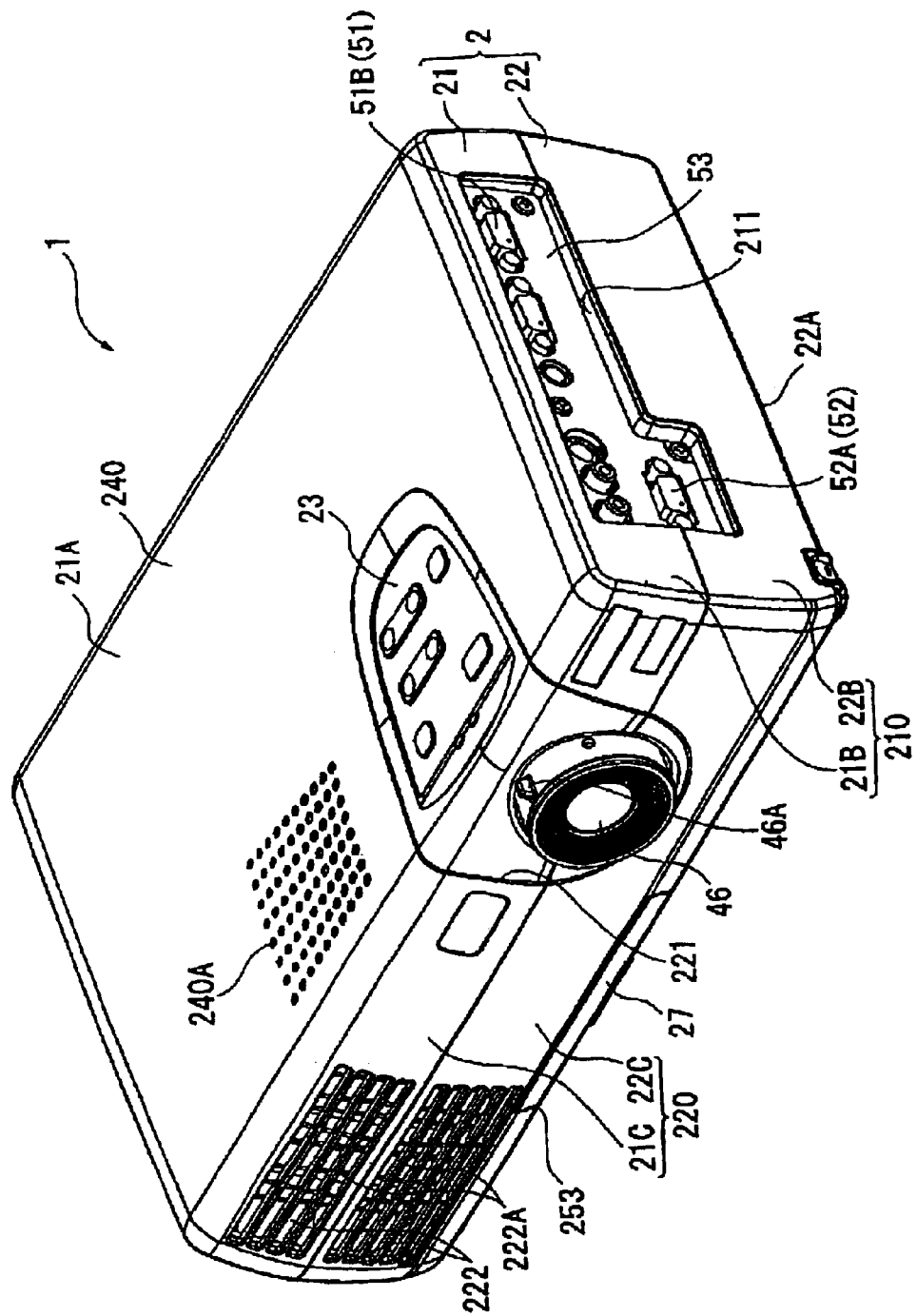
FIG. 1 is an entire perspective view showing a projector seen from upper front side thereof according to embodiments of the present invention.
Figure 2:
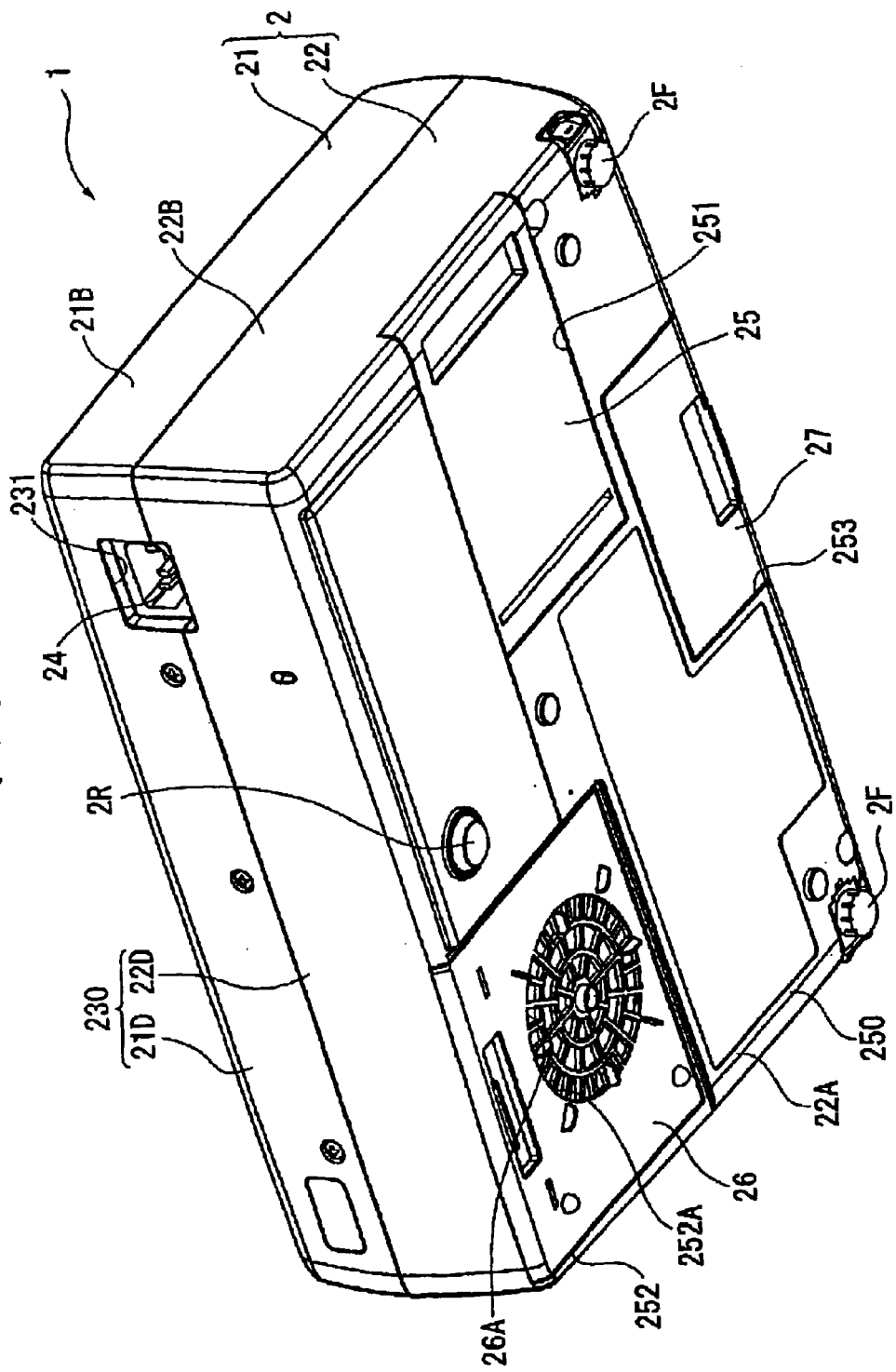
FIG. 2 is an entire perspective view showing the projector of the aforesaid embodiments seen from lower rear side.

FIG. 1 is a perspective view of a projector 1 seen from upper front side according to an aspect of the present invention. FIG. 2 is a perspective view of the projector 1 seen from lower rear side.

As shown in FIGS. 1 and 2, the projector 1 has an approximately rectangular parallelepiped exterior case 2. The exterior case 2 is a casing for accommodating a body of the projector 1, which includes an upper case 21 and a lower case 22, the cases 21 and 22 being attachable and detachable.

As shown in FIGS. 1 and 2, the upper case 21 includes an upper portion 21A, a lateral portion 21B, a front portion 21C and a rear portion 21D respectively constituting the upper side, lateral side, front side and rear side of the projector 1.

In the same manner, the lower case 22 includes a lower portion 22A, a lateral portion 22B, a front portion 22C and a rear portion 22D respectively constituting the lower side, lateral side, front side and rear side of the projector 1.

Accordingly, as shown in FIGS. 1 and 2, the lateral sides 21B and 22B of the upper case 21 and the lower case 22 are continuously connected to form a lateral side 210 of the rectangular parallelepiped exterior case 2. Similarly, the front portions 21C and 22C are connected to form a front side 220, the rear portions 21D and 22D are connected to form a rear side 230, the upper portion 21A forms an upper side 240 and the lower portion 22A forms a lower side 250.

As shown in FIG. 1, an operation panel 23 is provided on the front side of the upper side 240, and a sound-outputting speaker hole 240A is formed around the operation panel 23.

An opening 211 spanning over the two lateral portions 21B and 22B is formed on the lateral side 210 on the right side seen from front side. A below-described main board 51 and an interface board 52 are provided in the exterior case 2 and a connector 51B installed on the main board 51 and a connector 52A installed on the interface board 52 are exposed to the outside through an interface panel attached to the opening 211. Exterior electronics etc. are connected to the projector through the connectors 51B and 52A.

A circular opening 221 spanning between two front portions 21C and 22C is formed around the operation panel on the right side seen from the front side 220. A projection lens 46 is disposed inside the exterior case 2 corresponding to the opening 221. At this time, a distal end of the projection lens 46 is exposed to the outside from the opening 221 and the focusing operation of the projection lens 46 can be manually conducted through a lever 46A as a part of the exposed portion.

An exhaust hole 222 is formed on the front side 220 opposite to the opening 221. A safety cover 222A is formed on the exhaust hole 222.

As shown in FIG. 2, a rectangular opening 231 is formed on the right side of the rear side 230 seen from rear side. An inlet connector 24 is exposed from the opening 231.

A rectangular opening 251 is formed at the center of the right end of the lower side 250 seen from bottom side. A lamp cover 25 covering the opening 251 is detachably attached to the opening 251. A non-illustrated light source lamp can be easily exchanged by detaching the lamp cover 25.

A rectangular surface 252 dented inward is formed on the left rear corner of the lower side 250 seen from bottom side. An intake 252A for drawing in cooling air from the outside is formed on the rectangular surface 252. An intake cover 26 covering the rectangular surface is detachably provided on the rectangular surface 252. An opening 26A corresponding to the intake 252A is formed on the intake cover 26. A non-illustrated air filter is provided on the opening 26A to prevent invasion of dust into the interior of the casing.

A rear leg 2R constituting one of the legs of the projector 1 is formed approximately at the center on the rear side of the lower side 250. Further, front legs 2F also constituting the legs of the projector 1 are respectively provided on the right and left corners on the front side of the lower side 250. In other words, the projector 1 is supported on three points by the rear leg 2R and the two front legs 2F.

The two front legs 2F is vertically advanceable and retractable, so that the inclination (altitude) of the projector 1 in front and back direction and right and left direction can be adjusted to adjust the position of the projection image.

Further, as shown in FIGS. 1 and 2, a rectangular parallelepiped recess 253 is formed approximately at the center of the front side of the exterior case 2 spanning over the lower side 250 and the front side 220. A cover 27 covering the lower side and front side of the recess 253 and slidable in front and back direction is provided on the recess 253. A non-illustrated remote controller for remotely controlling the projector 1 is accommodated in the recess 253 covered by the cover 27.

Figure 3:
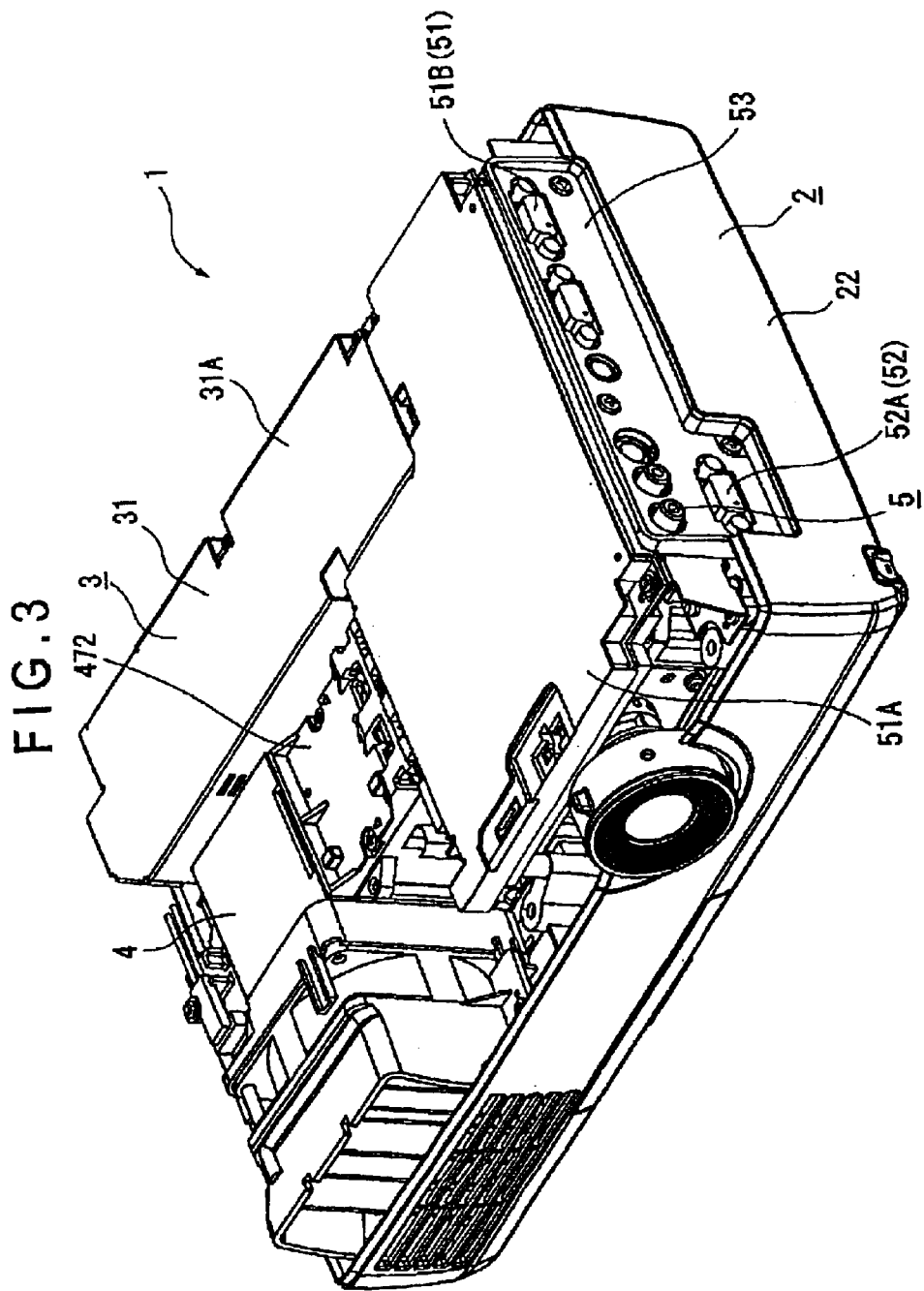
FIG. 3 is a perspective view showing the interior of the projector of the aforesaid embodiments, which specifically shows a condition where an upper case of the projector is removed from FIG. 1.
Figure 4:
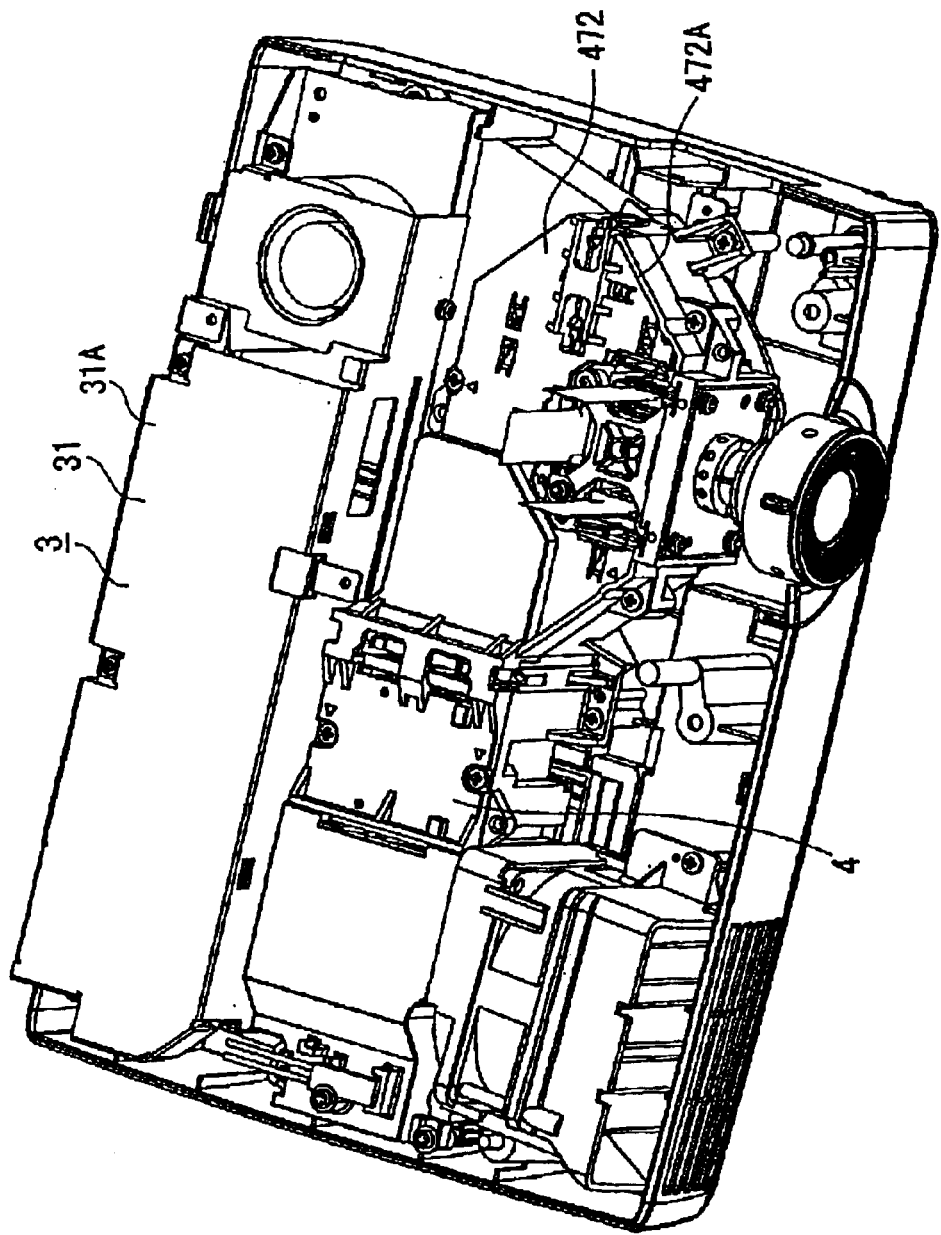
FIG. 4 is a perspective view showing the interior of the projector of the aforesaid embodiments, which specifically shows a condition where a control board is removed from FIG. 3.

FIGS. 3 and 4 are perspective view showing the interior of the projector 1. Specifically, FIG. 3 is an illustration showing the upper case 21 being removed from FIG. 1. FIG. 4 is an illustration with a control board 5 being removed from FIG. 3.

As shown in FIGS. 3 and 4, the exterior case has a power source unit 3 disposed along the rear side and extending in right and left direction, an optical unit 4 disposed on the front side of the power source unit 3 as a planarly-viewed L-shaped optical system and the control board 5 as a controller disposed on the upper right side of the units 3 and 4.

The power source unit 3 has a power source 31 and a non-illustrated lamp driving circuit (ballast) disposed below the power source 31.

The power source 31 supplies the electric power from the outside to the lamp driving circuit, the circuit board 5 etc. through a non-illustrated power cable connected to the inlet connector.

The lamp driving circuit supplies electric power fed by the power source 31 to a light source lamp (not shown in FIGS. 3 and 4) of the optical unit 4, which is electrically connected to the light source lamp. The lamp driving circuit is, for instance, constructed by wiring on a board.

The power source 31 and the lamp driving circuit are vertically arranged approximately in parallel, which occupy the space extending in right and left direction on the rear side of the projector 1.

The surroundings of the power source 31 and the lamp driving circuit are covered with a metal shield 31A such as aluminum with right and left sides thereof being opened.

The shield 31A works as a duct for guiding the cooling air and prevents leakage of the electromagnetic noise generated by the power source 31 and the lamp driving circuit toward the outside.

As shown in FIG. 3, the control board 5 is disposed to cover the upper side of the units 3 and 4, which includes the main board 51 including a CPU and the connector 51B and the interface board 52 disposed below the main board 51 and including the connector 52A.

In the control board 5, the CPU on the main board 51 controls a liquid crystal panel of the below-described optical device in accordance with the image information inputted through the connectors 51B and 52A.

The surroundings of the main board 51 is covered with a metal shield 51A. Though not clearly shown in FIG. 3, the main board 51 abuts to an upper end 472A of an upper inner case 472 of the optical unit 4.

[2. Detailed Construction of Optical Unit]

Figure 5:
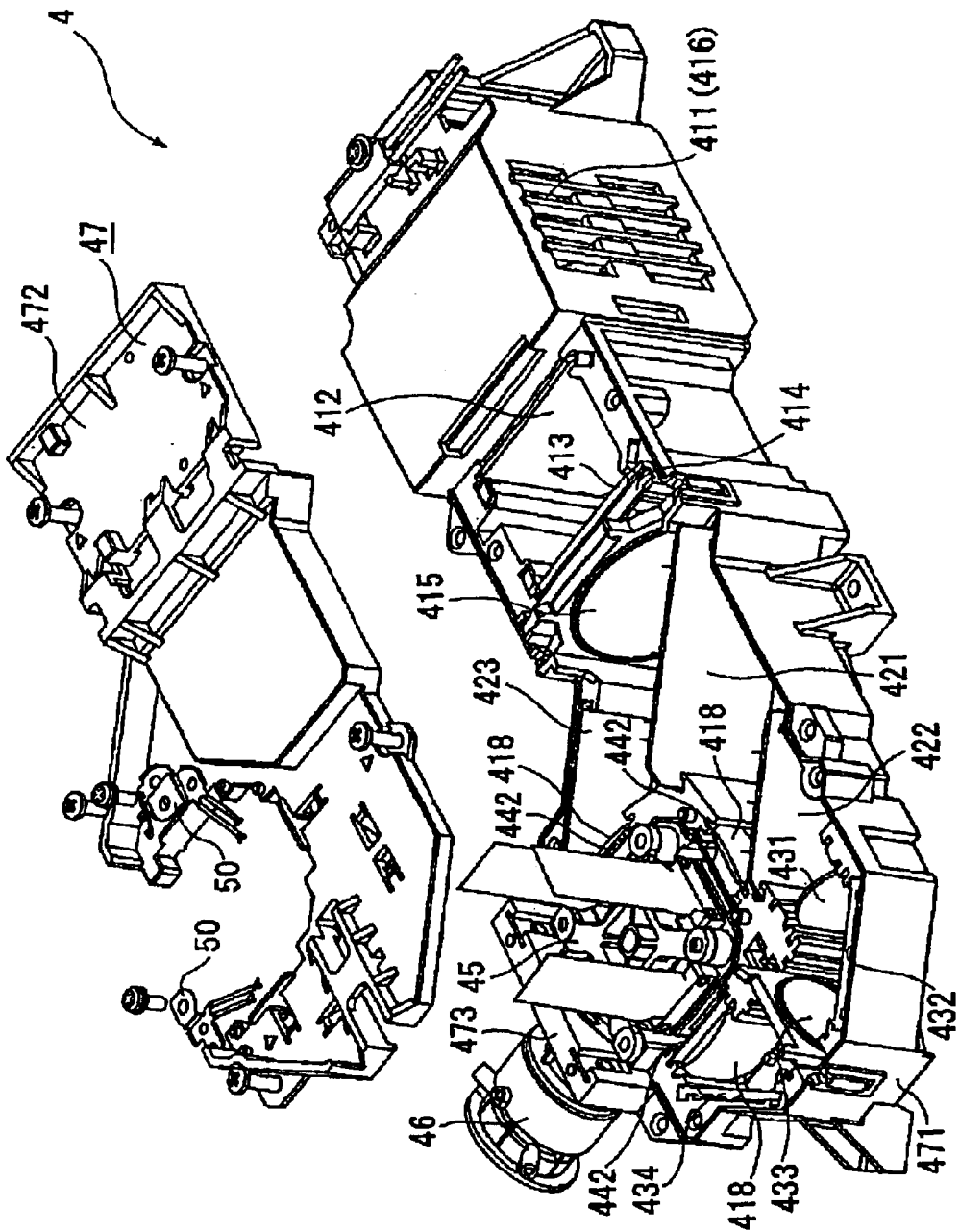
FIG. 5 is an exploded perspective view showing an optical unit of the aforesaid embodiments.
Figure 6:
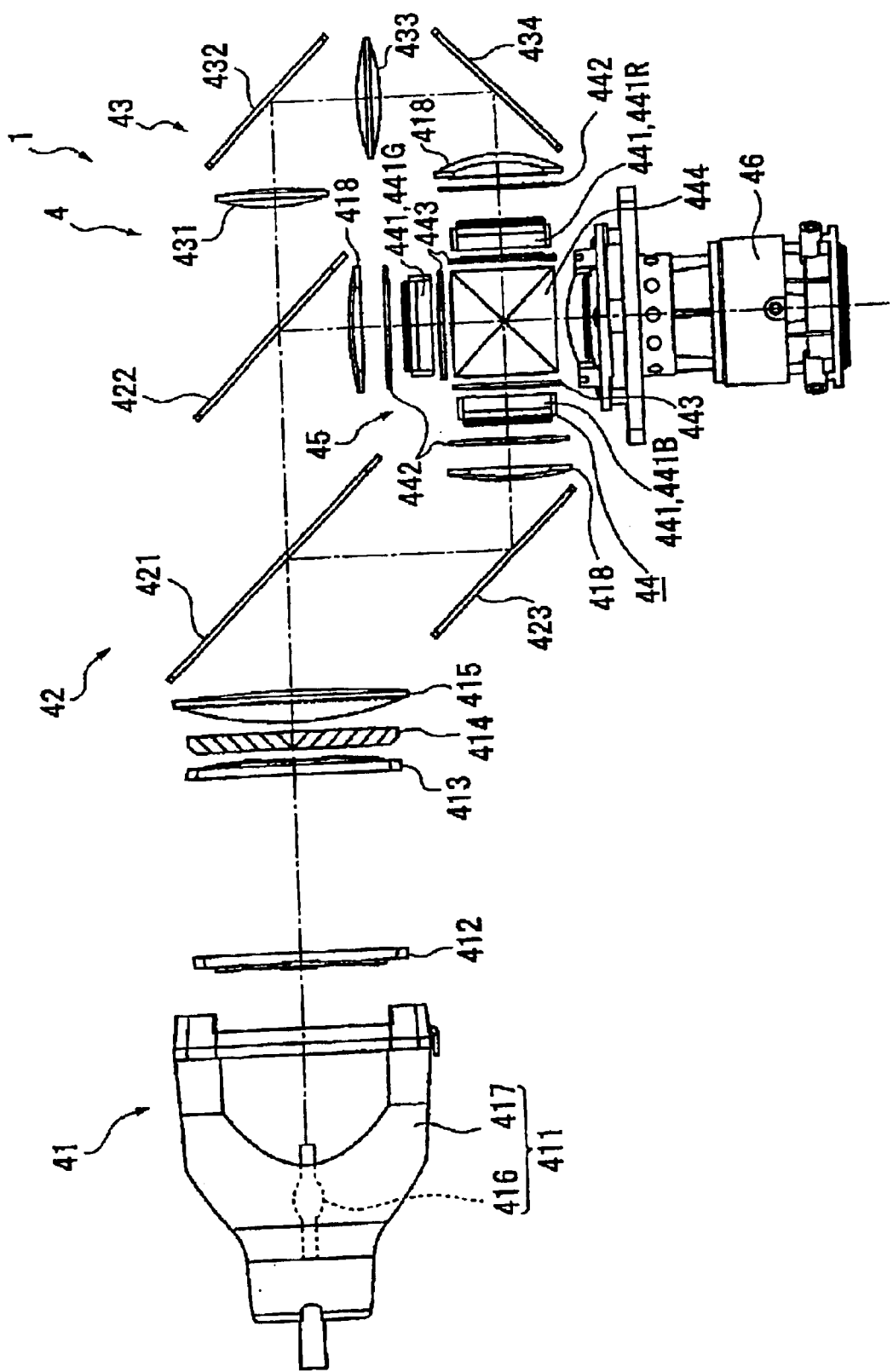
FIG. 6 is a schematic illustration of the optical unit of the aforesaid embodiments.

FIG. 5 is an exploded perspective view showing the optical unit 4. FIG. 6 is a schematic illustration of the optical unit 4.

As shown in FIG. 6, the optical unit 4 is a unit for optically process the light beam irradiated by a light source lamp 416 of a light source 411 to form an optical image corresponding to the image information and project the optical image in an enlarged manner, which includes an integrator illuminating optical system 41 as an illumination optical system, a color separating optical system 42, a relay optical system 43, an optical device 44, the projection lens 46 as a projection optical system, and an inner case 47 made of synthetic resin for accommodating the optical components 41 to 44 and 46 (FIG. 5).

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes the light source 411, a first lens array 412, a second lens array 413, a polarization converter 414 and a superposing lens 415.

The light source 411 has the light source lamp 416 as a radiation light source and a reflector 417, which changes the radial light beam irradiated by the light source lamp 416 into a parallel light beam by the reflector 417 to emit the parallel light beam toward the outside. A high-pressure mercury lamp is used as the light source lamp 416. Incidentally, metal halide lamp and a halogen lamp etc. may be used instead of the high-pressure mercury lamp. A parabolic mirror is used as the reflector 417. Incidentally, a combination of parallelizing concave lens and ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415. The polarization converter 414 converts the light from the second lens array 413 to uniform polarization light in order to enhance light utilization efficiency in the optical device 44.

The respective sub-beans converted into single polarization light by the polarization converter 414 are substantially superposed on the liquid crystal panel 441 of the optical device 44 by superposing lens 415. Since the projector 1 using the liquid crystal panel 441 for modulating polarization light can use only single polarization light, approximately half of the light from the light source lamp 416 emitting other random polarization light cannot be used. Accordingly, by using the polarization converter 414, all of the light emitted from the light source lamp 416 is converted into single polarization light to enhance light utilization efficiency in the optical device 44.

Details of the polarization converter 414 will be described below.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection mirrors 432 and 434, and introduces the red color light separated by the color separating optical system 42 onto the liquid crystal panel 441R.

At this time, the red light component and the green light component of the light beam irradiated from the illuminating optical integrator system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441R function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418. Incidentally, though the red light passes through the relay optical system 43, blue light may pass through the relay optical system 43 instead of red light.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a polysilicon TFT as a switching element.

In the optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image.

The incident-side polarization plate 442 transmits only a polarization light of a predetermined direction among the respective color lights separated by the color separating optical system and absorbs the other light beam, which is constructed by forming a polarization film on a substrate of sapphire glass etc. Incidentally, polarization film may be formed on the field lens 418 without employing the substrate.

The irradiation-side polarization plate 443 is constructed in an approximately the same manner as the incident-side polarization plate 442, which transmits only a polarization light of a predetermined direction among the light beam irradiated by the liquid crystal panels 441 (441R, 441G and 441B) and absorbs the other light beam. Incidentally, polarization film may be formed on the cross dichroic prism 444 without employing substrate.

The polarization axes of the incident-side polarization plate 442 and the irradiation-side polarization plate 443 are set orthogonal with each other.

The cross dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining thee color lights.

Figure 7:
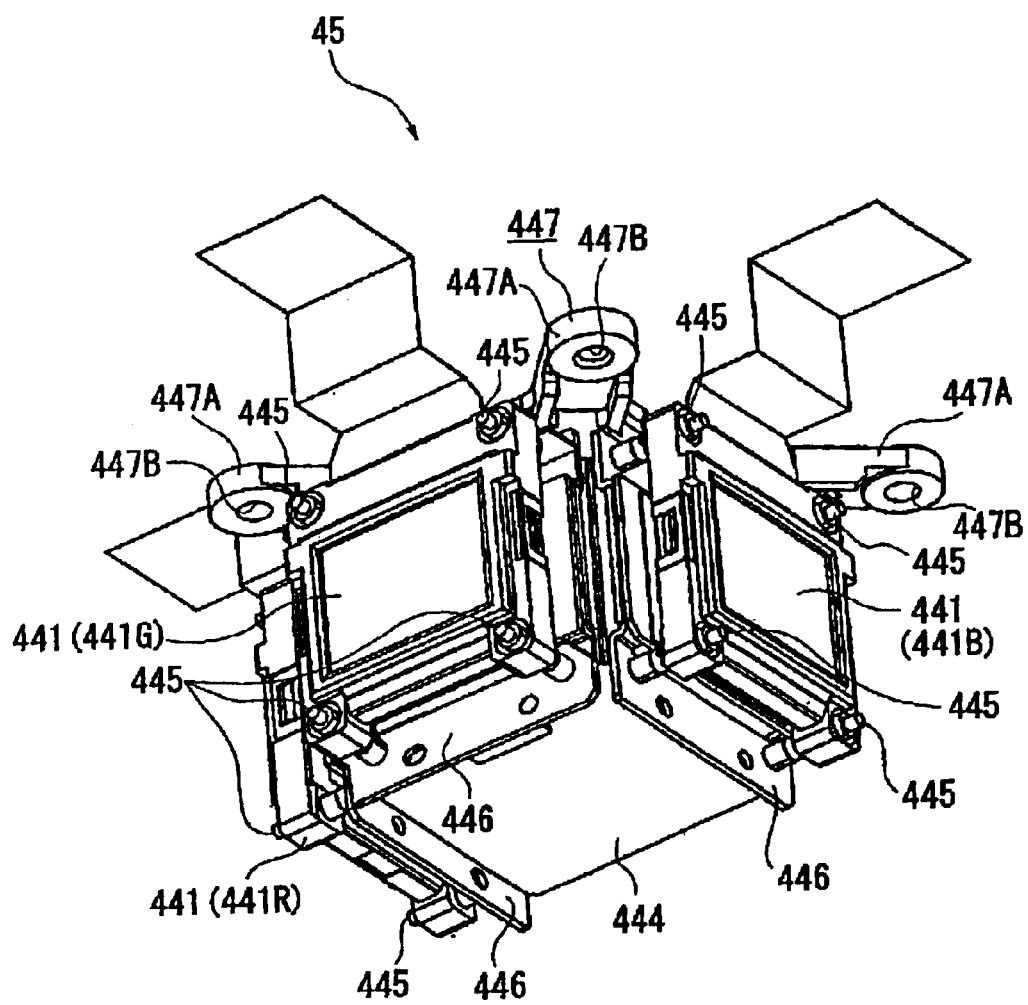
FIG. 7 is a perspective view showing an optical device body of the aforesaid embodiments seen from lower side.

The above-described liquid crystal panels 441, the irradiation-side polarization plate 443 and the cross dichroic prism 444 are constructed as an integrated unit of optical device body 45. FIG. 7 is a perspective view showing the optical device body 45.

As shown in FIG. 7, the optical device body 45 has the cross dichroic prism 444, a fixing plate 447 made of synthetic resin and fixed on the upper side of the cross dichroic prism 444, a metal holding plate 446 attached to the light-incident side of the cross dichroic prism 444 for holding the irradiation-side polarization plate 443, and the liquid crystal panels 441 (441R, 441G and 441G) held by four pins 445 made of transparent resin attached to the light-incident side of the holding plate 446.

A predetermined gap is secured between the holding plate 446 and the liquid crystal panel 441, so that the cooling air can flow through the gap.

The optical device body 45 is screwed to the lower inner case 471 through a circular hole 447B of four arms 447A formed on the fixing plate 447.

The projection lens 46 enlarges and projects the color image combined by the cross dichroic prism 444 of the optical device 44.

As shown in FIG. 5, the inner case 47 has the lower inner case 471 having a groove on which the optical components 412 to 415, 418, 421 to 423, 431 to 434 and 442 are slidably fitted from the above, and a lid-shaped upper inner case 472 for closing the upper opening of the lower inner case 471.

As shown in FIG. 5, the light source 411 is accommodated on a side of the lower inner case 471 of approximately planarly-viewed L-shape. The projection lens 46 is screwed to the other end of the lower inner case 471 through a head component formed on the lower inner case 471.

As shown in FIG. 5, the optical device body 45 accommodated in the lower inner case 471 is screwed to the lower inner case 471 with two springs 50 being sandwiched. The two springs 50 bias the incident-side polarization plate 442 toward lower side to fix the position thereof.

[3. Cooling Mechanism]

Figure 8:
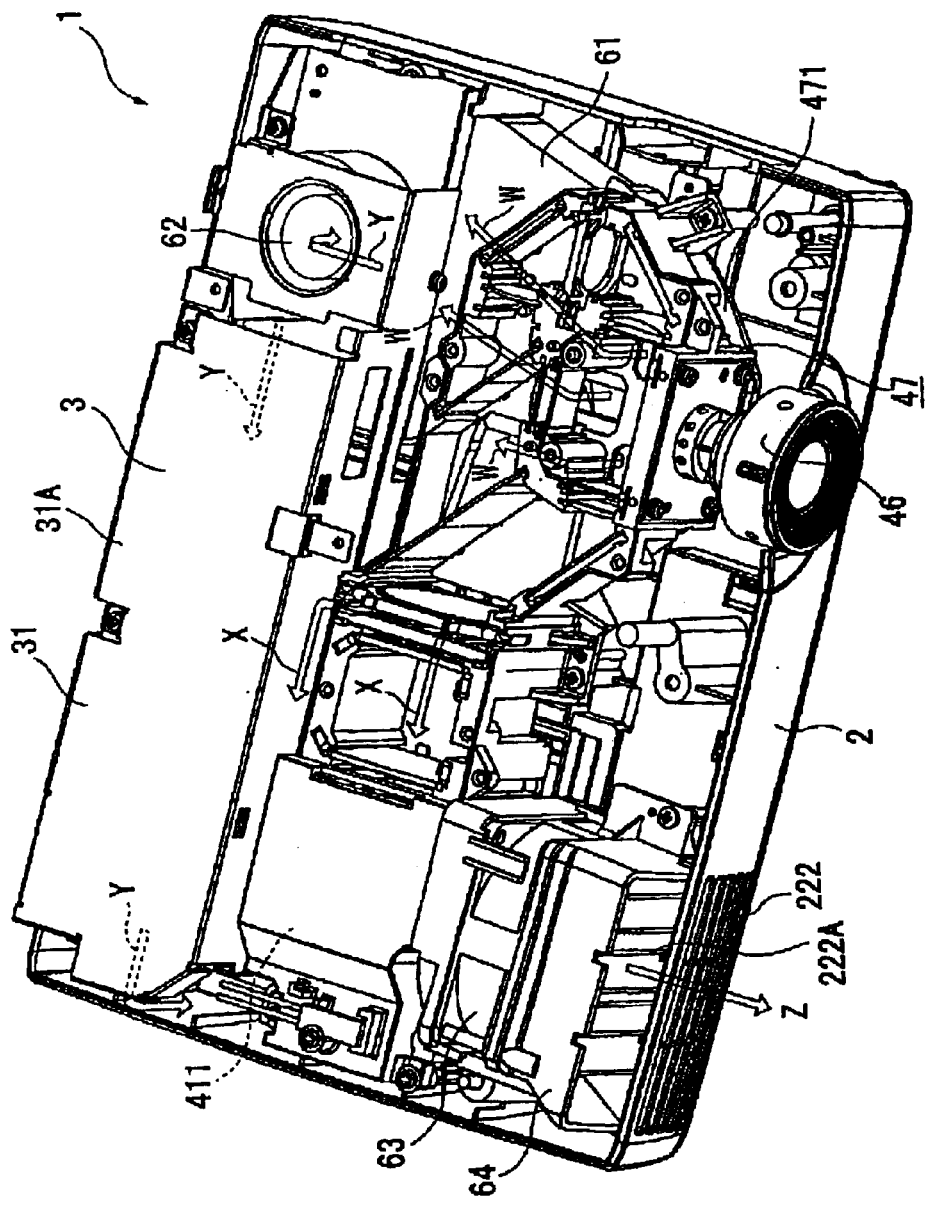
FIG. 8 is an illustration showing a flow of cooling air of panel cooling system W and power source cooling system Y of the aforesaid embodiments.
Figure 9:
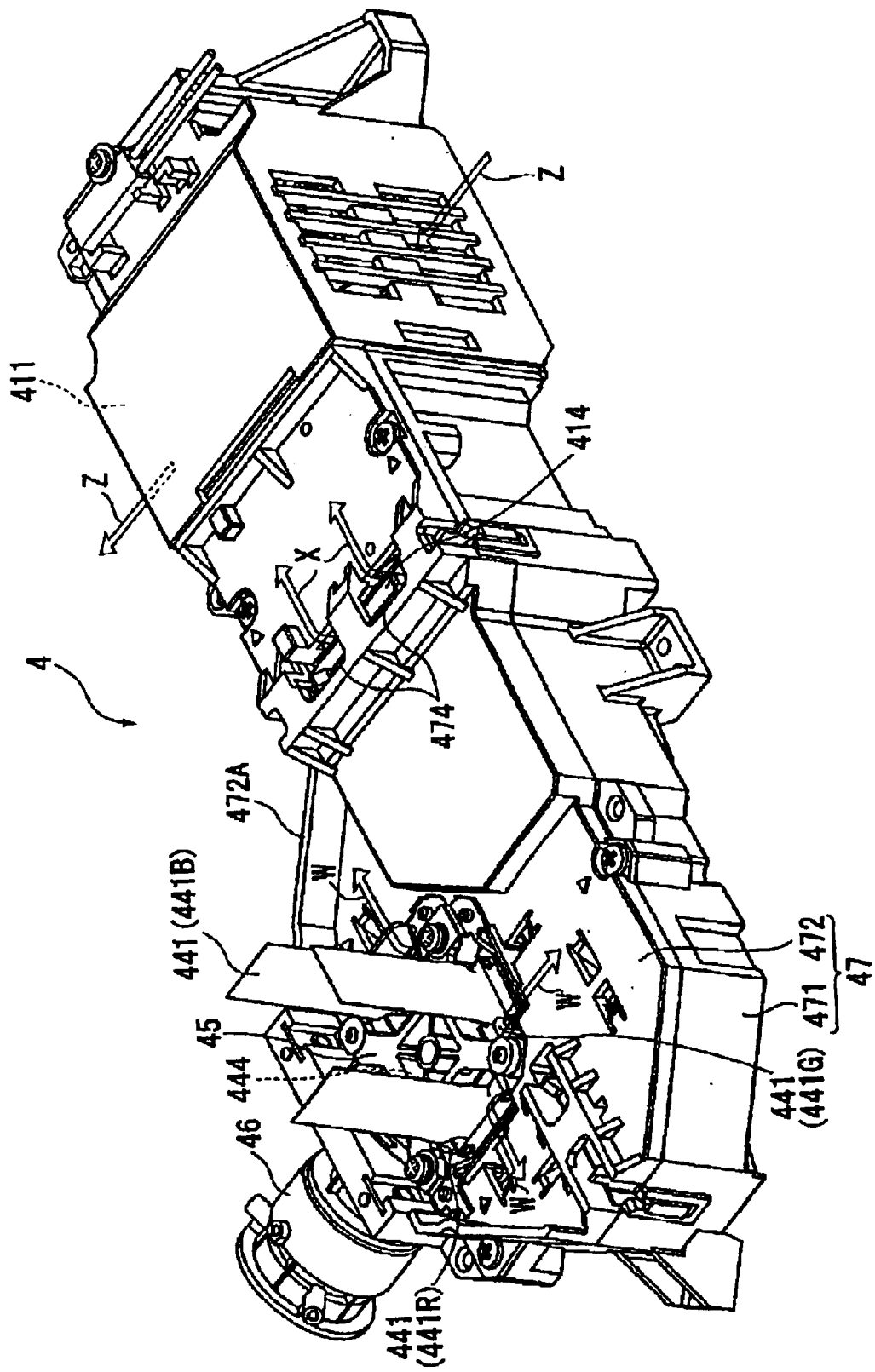
FIG. 9 is an illustration showing a flow of cooling air of the panel cooling system W and a polarizing conversion element cooling system X of the aforesaid embodiments.

FIG. 8 is an illustration removing the upper inner case and the optical device body 45 from FIG. 4. FIG. 9 is a perspective view showing the optical unit 4.

As shown in FIGS. 8 and 9, the projector 1 has a panel cooling system W mainly for cooling the liquid crystal panel 441, a polarizing conversion element cooling system X mainly for cooling the polarization converter 414, a power source cooling system Y mainly for cooling the power source unit 3, and a light source cooling system Z mainly for cooling the light source 411.

As shown in FIG. 8, a large sirocco fan 61 disposed on the lower side of the power source unit 3 is used in the panel cooling system W.

In the panel cooling system W, as shown in FIGS. 8 and 9, the outside cooling air introduced from the intake (FIG. 2) formed on the lower side 250 of the exterior case 2 is guided to the lower side of the optical device body 45 by the sirocco fan 61 through a non-illustrated duct, which enters into the inner case 47 from the intake formed on the lower side of the respective liquid crystal panels 441 of the lower inner case 471. As shown in FIG. 9, the cooling air passes trough the gap between the respective liquid crystal panels 441R, 441G and 441B and the cross dichroic prism 444 to cool the liquid crystal panel 441 and the irradiation-side polarization plate to be discharged to the space between the upper inner case 472 and the control board. The air discharged to the spaces is prevented from flowing toward the projection lens 46 by the contact of the upper end 472A of the upper inner case 472 and the control board 5.

The cooling air drawn in by the sirocco fan 61 is introduced to the lower side of the polarization converter 414 by a non-illustrated duct disposed on the lower side of the lower inner case 471, which enters into the inner case 47 from the intake formed on the lower side of the polarization converter 414 of the lower inner case 471 to cool the polarization converter 414 to be discharged from an exhaust hole 474 formed on the upper inner case 472.

A small sirocco fan 62 disposed on the upper side of the sirocco fan 61 sandwiching a metal plate is used in the power source cooling system Y as shown in FIG. 8.

In the power source cooling system Y, the cooling air flowing into the space between the upper inner case 472 and the control board 5 by the panel cooling system W is drawn in by the sirocco fan 62 while cooling the control board 5 to be discharged into the power source unit 3. The air discharged into the power source unit 3 flows along the shield 31A to cool the power source 31 and the lamp driving circuit to be discharged from an opening opposite to the sirocco fan 62.

The light source cooling system Z uses an axial-flow fan 63 disposed on the front side of the light source 411 and a duct 64 attached to the axial-flow fan 63.

In the light source cooling system Z, the air discharged by the power source cooling system Y and the polarizing conversion element cooling system X enters into the light source 411 from the slit-shaped opening formed on the lateral side of the light source 411 being drawn by the axial-flow fan 63 to cool the light source lamp 416 and is discharged from the exhaust hole 222 of the exterior case 2 toward the outside through the duct 64.

[4. Structure of Polarization Converter]

Figure 10:
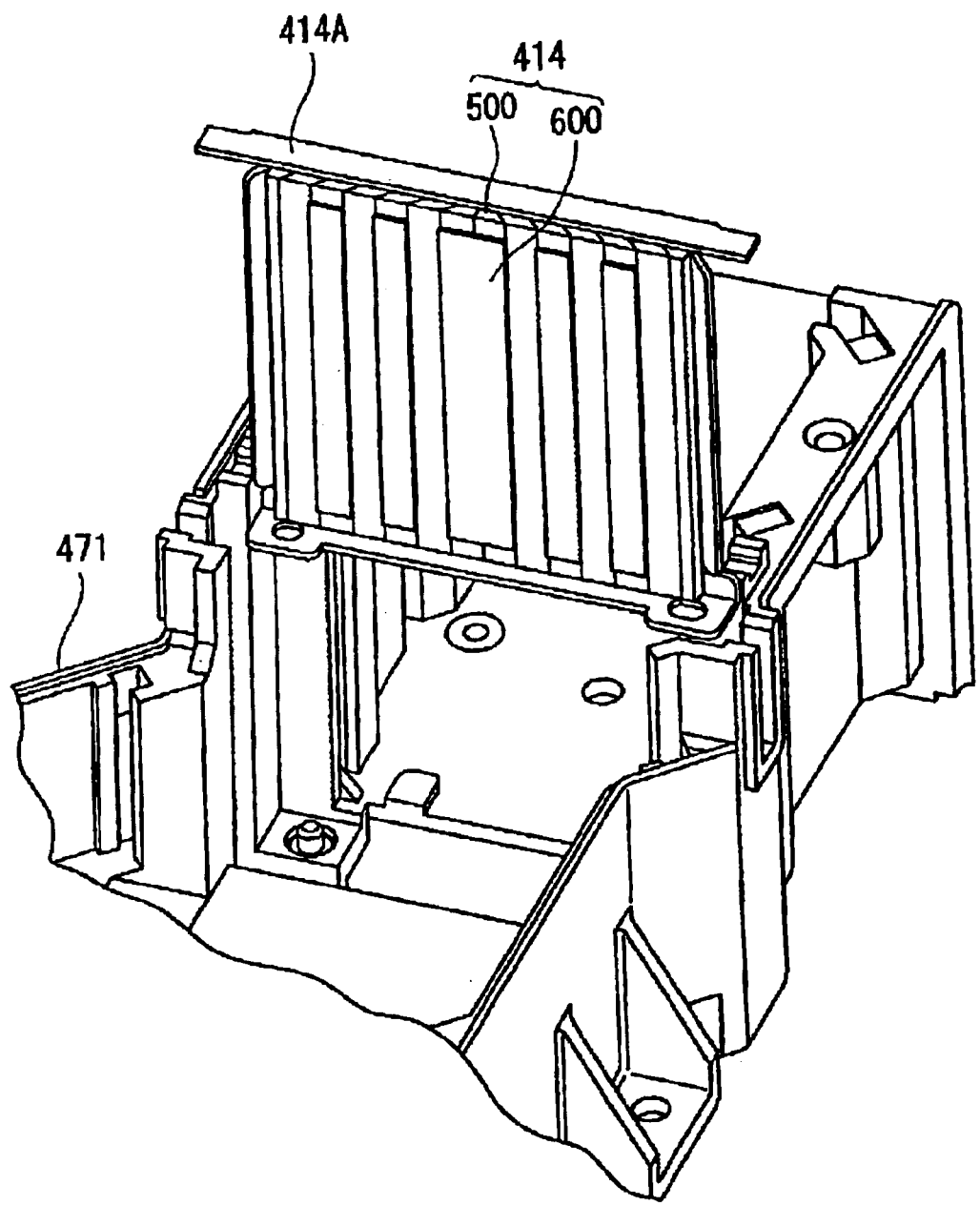
FIG. 10 is an exploded perspective view showing a disposition of the polarization converter of the aforesaid embodiments.

FIG. 10 is an exploded perspective view showing the location of the polarization converter relative to the lower inner case 471.

Figure 11:
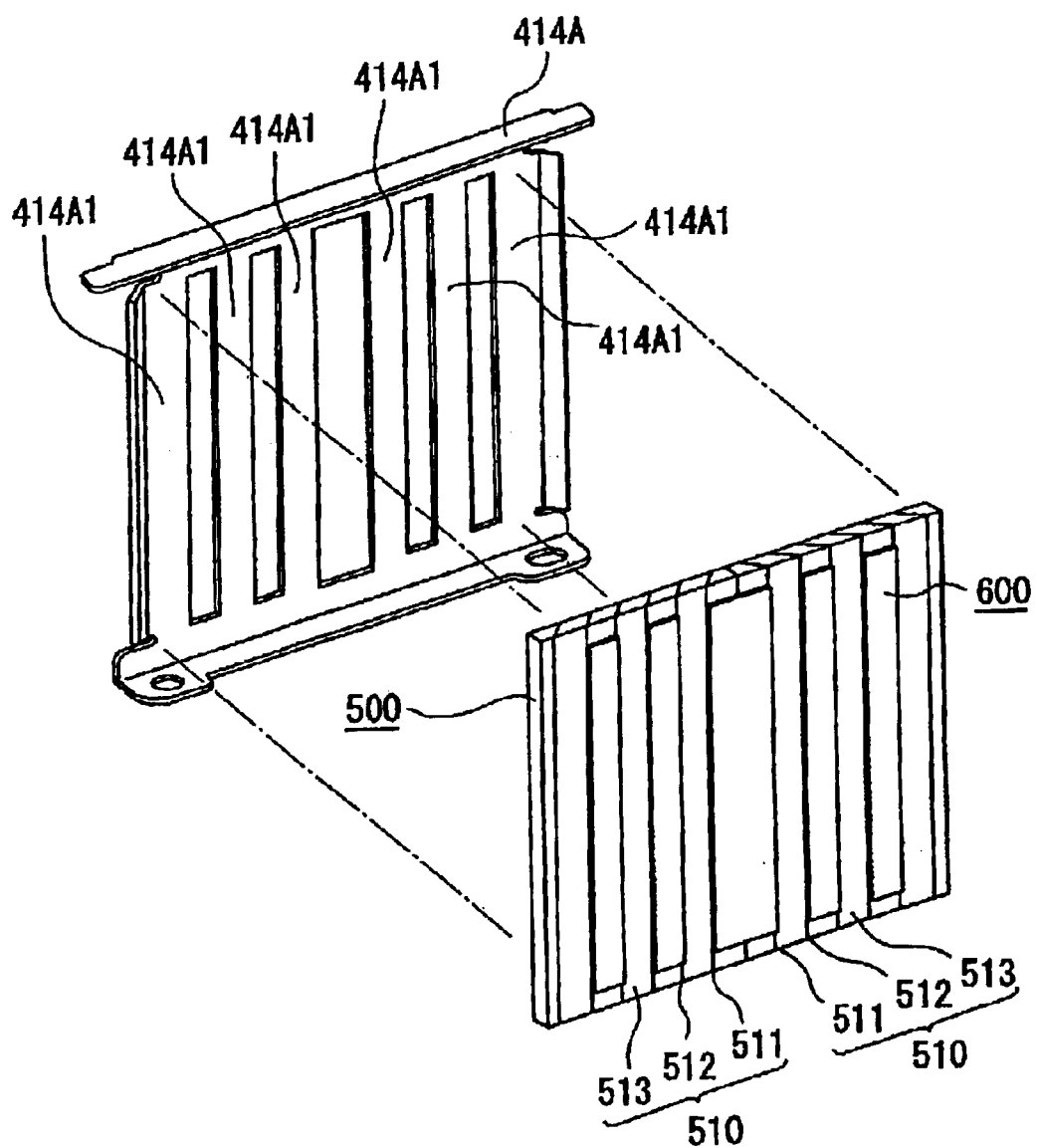
FIG. 11 is an exploded perspective view showing an arrangement of the polarization converter of the aforesaid embodiments.

FIG. 11 is an exploded perspective view showing the structure of the polarization converter 414.

The polarization converter 414 transmits the light beam condensed by the lenses of the second lens array 413 to convert into approximately a single uniform polarization light, which includes a polarizing conversion element array 500 for irradiating the light beam after separating into two linearly polarization beams, and a retardation plate 600 attached to the polarizing conversion element array 500 to turn the polarization axis of one of the two linearly polarization beams irradiated by the polarizing conversion element array 500 by ninety degrees to align with the polarization axis of the other linearly polarization beam, the polarization converter 414 being fixed on the lower inner case 471 by a fixing frame 414A for holding the light-incident side and the outer circumference thereof.

As shown in FIG. 11, the polarizing conversion element array 500 is constructed by bonding two polarizing conversion elements 510 having a polarization separating film 511 for separating the light beam into two linearly polarization beams, a reflecting film 512 for reflecting one of the linearly polarization beam separated by the polarization film 511, and a sheet glass 513 as a light-transmissive member interposed between the polarization separating film 511 and the reflecting film 512.

The polarizing conversion element 510 is ordinarily constructed as follows.

Figure 12:
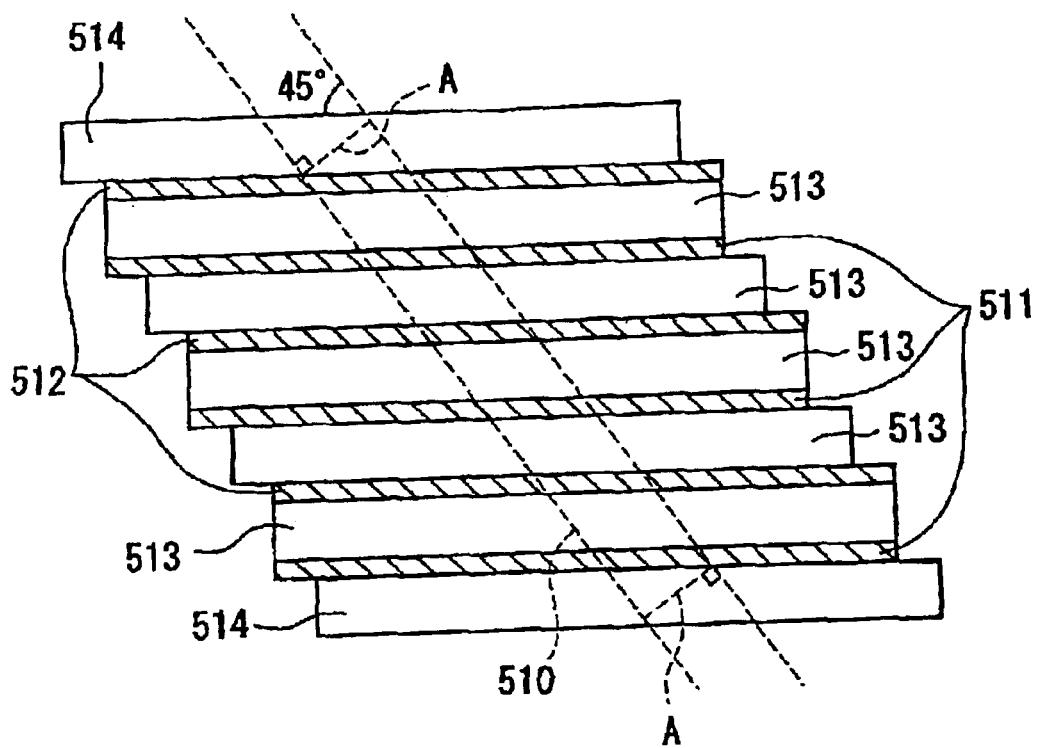
FIG. 12 is a schematic illustration showing production process of the polarizing conversion element of first embodiment of the present invention.

As shown in FIG. 12, the sheet glass 513 having the polarization separating film 511 and the reflecting film 512 on both sides thereof and the sheet glass 513 having no films are alternately bonded by an adhesive so that the polarization separating film 511 and the reflecting film 512 are alternately arranged. At this time, a sheet glass 514 having no polarization film and reflecting film is disposed on the upper and lower sides of the bonded sheet glass 513.

The bonded glass sheets 513 is cut in parallel approximately at forty-five degrees relative to the surface thereof, and the protruded portion on both sides are cut at a cutting surface A to form an approximately rectangular parallelepiped. At this time, the protruded portions on both sides are cut so that the polarization separating film 511 is exposed on the corner. Lastly, the cutting surface is polished to form the polarizing conversion element 510.

According to the above production process, the polarization separating film 511 and the reflecting film 512 of the polarizing conversion element 510 are inclined approximately at forty-five degrees relative to the light-incident side and the light-irradiation side and are arranged at an even pitch.

Figure 13:
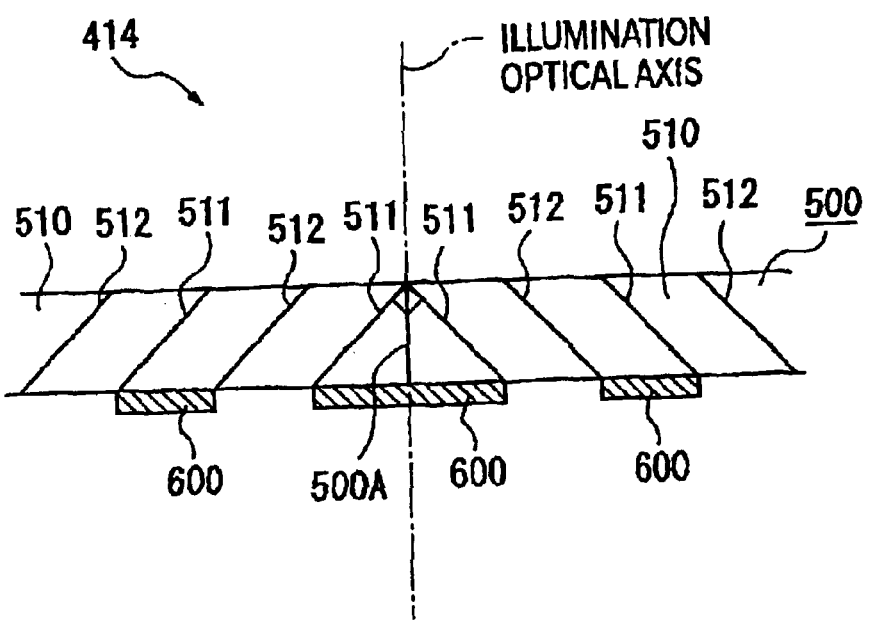
FIG. 13 is a schematic illustration showing the polarization converter of the first embodiment of the present invention.

FIG. 13 is a schematic illustration of the polarization converter 414 seen from above.

In the polarization converter 414, two polarizing conversion elements 510 are closely contacted so that the polarization separating films 511 located adjacent to the end of the polarizing conversion element are mutually opposed to form the polarizing conversion element array 500 and the retardation plate 600 is attached on the light-irradiation side of the polarization converter 414 stretching over the two polarizing conversion elements 510.

At this time, the polarization separating films 511 of the respective polarizing conversion elements 510 are arranged approximately in reverse V-shaped cross section, and the polarization separating films 510 continuously extends approximately at ninety degrees at a contact surface 500A on which the respective polarizing conversion elements 510 are in close contact with each other. Accordingly, the light beam irradiate by the light source lamp 416 on the illumination optical axis having strong luminance is irradiated on the polarization separating film connected approximately at ninety degrees.

The polarization separating film 511 is constructed of dielectric multi-layer film etc. with Brewster's angle of approximately forty-five degrees. The polarization separating film 511 reflects a light beam (S polarization light) having a polarization axis parallel to the incident surface of the polarization separating film 511 and transmits the light beam (P polarization light) having a polarization axis orthogonal with the S polarization light.

The reflecting film 512 is made of a single metal having high reflectivity such as aluminum, gold, silver, copper and chromium or an alloy thereof, which reflects the S polarization light reflected by the polarization separating film 511.

The sheet glass 513 transmits the light beam therethrough, which is made of white sheet glass etc.

The retardation plate 600 turns the polarization axis of the P polarization light transmitted through the polarization separating film 511 by ninety degrees, which is adhered on a surface of the light-irradiation side on which the polarization separating film 511 projects image. The retardation plate 600 disposed on the illumination optical axis stretches over the two polarizing conversion elements 510.

Figure 14:
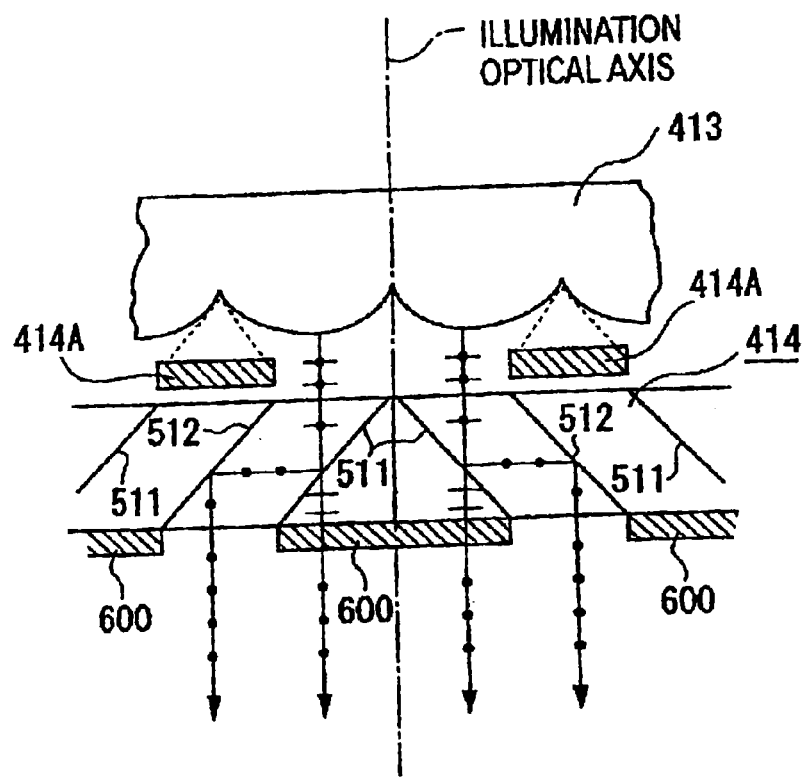
FIG. 14 is a schematic illustration showing basic function of the polarization converter of the first embodiment.

FIG. 14 is a schematic illustration showing basic function of the polarization converter 414.

The light beam incident on the second lens array 413 is condensed by the lenses to enter on a predetermined area of the polarization converter 414. The light beam irradiated by the second lens array 413 has random polarization axis.

The light beam incident on the polarization converter 414 is separated into P polarization light and S polarization light by the polarization separating film 511. In other words, the P polarization light transmits through the polarization separating film 511 and the S polarization light is reflected by the polarization separating film 511 so that optical axis thereof is turned by approximately ninety degrees.

The S polarization light reflected by the polarization separating film 511 is reflected by the reflecting film 512 and the optical path thereof is again turned by ninety degrees to advance in approximately the same direction as the incident direction toward the polarization converter 414.

The P polarization light transmitted through the polarization separating film 511 enters on the retardation plate 600, where the polarization axis thereof is turned by ninety degrees to be converted into and irradiated as S polarization light.

Accordingly, the light beam irradiated by the polarization converter 414 becomes approximately uniform S polarization light.

As shown in FIG. 11, the fixing frame 414A holding the polarization converter 414 is of approximately rectangular form and has a light shield 414A1 formed in matrix along upper and lower peripheries, so that the light beam irradiated by the second lens array 413 and advancing to ineffective area generating ineffective polarization light is shielded.

Specifically, the light beam irradiated by the lenses of the second lens array 413 preferably is condensed on the polarization separating film 511 of the polarization converter 414. However, as shown in dotted line in FIG. 14, some of the light beam directly enters on the reflecting film 512 without entering on the polarization separating film 511.

Though not specifically shown, the light beam directly entered on the reflecting film 512 is reflected by the reflecting film 512 to be incident on the polarization separating film 511 after the optical path thereof is turned by ninety degrees. The polarization separating film 511 transmits the P polarization light and reflects the S polarization light entering on the polarization separating film 511. In other words, the P polarization film transmitted through the polarization separating film 511 is reflected by the reflecting film 512 to be irradiated from the polarization converter 414 as the P polarization light. The polarization axis of the S polarization light reflected by the polarization separating film 511 is turned by ninety degrees by the retardation plate 600 to be irradiated from the polarization converter 414 as P polarization light.

Accordingly, P polarization light is contained in the irradiated light beam as well as the necessary S polarization light.

In order to avoid the above disadvantage, anti-reflecting film etc. is attached on the light-irradiation side of the light shield 414A1 of the fixing frame 414A to block the light beam advancing on the ineffective area.

[5. Advantage of Embodiment]

According to the above first embodiment, following advantages can be obtained.

(1) Since the polarizing conversion element array 500 of the polarization converter 414 has the pair of polarizing conversion elements 510 and the pair of polarizing conversion elements 510 are in close contact so that mutual polarization separating films 511 and the reflecting films 512 are opposed, the random polarization light passing through the gap between the two polarizing conversion elements 510 (illumination optical axis) can be converted into effective polarization light (S polarization light), thus enhancing luminance of the projector 1.

(2) Since the retardation plate 600 located on the illumination optical axis is adhered stretching over the two polarizing conversion elements 510, there is no interference of the mutual retardation plate 600 caused when the two polarizing conversion elements 510 are brought into close contact, so that it is not necessary to strictly determine the attachment accuracy of the retardation plate 600.

(3) Since the retardation plate 600 is adhered stretching over the two polarizing conversion elements 510, the number of the retardation plates 600 attached on the two polarizing conversion elements 510 can be reduced, thus reducing production steps for manufacturing the polarization converter 414.

(4) Since the polarization separating film 511 and the reflecting film 512 of the polarizing conversion element 510 are inclined approximately at forty-five degrees relative to light-incident direction, the ineffective area generating linearly polarization beam (P polarization light) different from the polarization axis of the necessary polarization light (S polarization light) is not unnecessarily enlarged, thus producing the polarizing conversion element 510 at an optimum condition.

(5) Since the integrator illumination optical system 41 has the polarization converter 414 constructed by bringing two polarizing conversion elements 510 into close contact, the light beam irradiated by the light source 411 can be irradiated after being converted into approximately uniform linearly polarization beam (S polarization light).

(6) Since the light beam irradiated by the light source 411 can be converted into approximately uniform linearly polarization beam (S polarization light) by the polarization converter 414, light utilization efficiency can be enhanced by irradiating approximately uniform linearly polarization beam (S polarization light) onto the liquid crystal panel 441 as an optical modulator, thereby vividly displaying the projection image projected by the projector 1.

(7) Since the polarizing conversion element 510 is formed approximately in rectangular parallelepiped and the polarization separating film 511 is exposed on the corner of the polarizing conversion element 510, the polarization separating films 511 are continuously extended when the two polarizing conversion elements 510 are brought into close contact so that the polarization separating films 511 and the reflecting film 512 are opposed, thereby converting the light beam from the light source on the illumination optical axis having especially strong luminous energy into approximately uniform polarization light to improve light utilization efficiency.

(8) Since the polarization converter 414 is supported by the fixing frame 414A and the fixing frame 414A has the light shield 414A1, even when the light beam condensed by the second lens array 413 advances to the ineffective area of the polarization converter 414, the light beam can be blocked by the light shield 414A1, thus preventing the ineffective polarization light from being contained in the light beam irradiated by the polarization converter 414.

[Second Embodiment]

Next, second embodiment of the present invention will be described below with reference to attached drawings.

In the following description, the same reference numeral will be attached to the same structure and the same component to omit or simplify the detailed description thereof.

In the first embodiment, the polarizing conversion element 510 is formed in approximately rectangular parallelepiped so that the ends of the two polarizing conversion elements 510 directly contact to be flush with each other when the two polarizing conversion elements 510 are brought into close contact.

On the other hand, in the second embodiment, an end of the light-irradiation side of the rectangular parallelepiped polarizing conversion element 510 is chipped, so that a notch 700 is formed on the contact portion between the retardation plate 600 and the two polarizing conversion elements 510 when the two polarizing conversion elements 510 are closely contacted and the retardation plate 600 is attached stretching over the two polarizing conversion elements 510.

Figure 15:
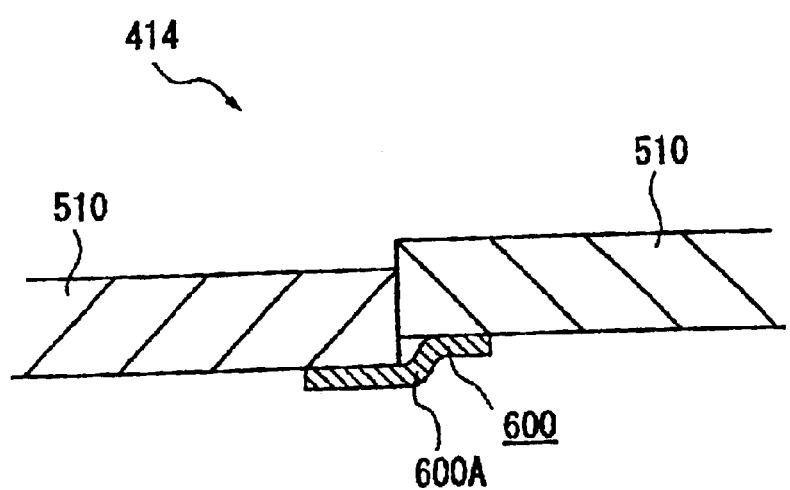
FIG. 15 is an illustration enlarging a contact portion of polarizing conversion elements of the first embodiment.

Ordinarily, when the two rectangular parallelepiped polarizing conversion elements 510 are brought into close contact, a step is likely to be generated at the contact portion as shown in FIG. 15. In order to eliminate such step, position of the two polarizing conversion elements 510 has to be strictly set.

Further, when the retardation plate 510 is attached on the light-irradiation side of the two polarizing conversion elements 510, the retardation plate 600 is aligned with the step, thus forming a bent portion 600A on the retardation plate 600 corresponding to the step.

When the light beam is irradiated on the polarization converter 414, the light beam on the illumination optical axis having strong luminous energy among the light beams irradiated by the light source 411 passes through the bent portion 600A of the retardation plate 600.

The incident light beam is easily absorbed by the bent portion 600A of the retardation plate 600 so that transmissivity is considerably deteriorated. In other words, the light beam on the illumination optical axis having especially strong luminous energy among the light beams irradiated by the light source 411 is absorbed to lower transmissivity on the illumination optical axis, so that light utilization efficiency is deteriorated.

In the second embodiment, the ends of the two polarizing conversion elements 510 located on the light-irradiation side are chipped to mitigate the step.

Figure 16:
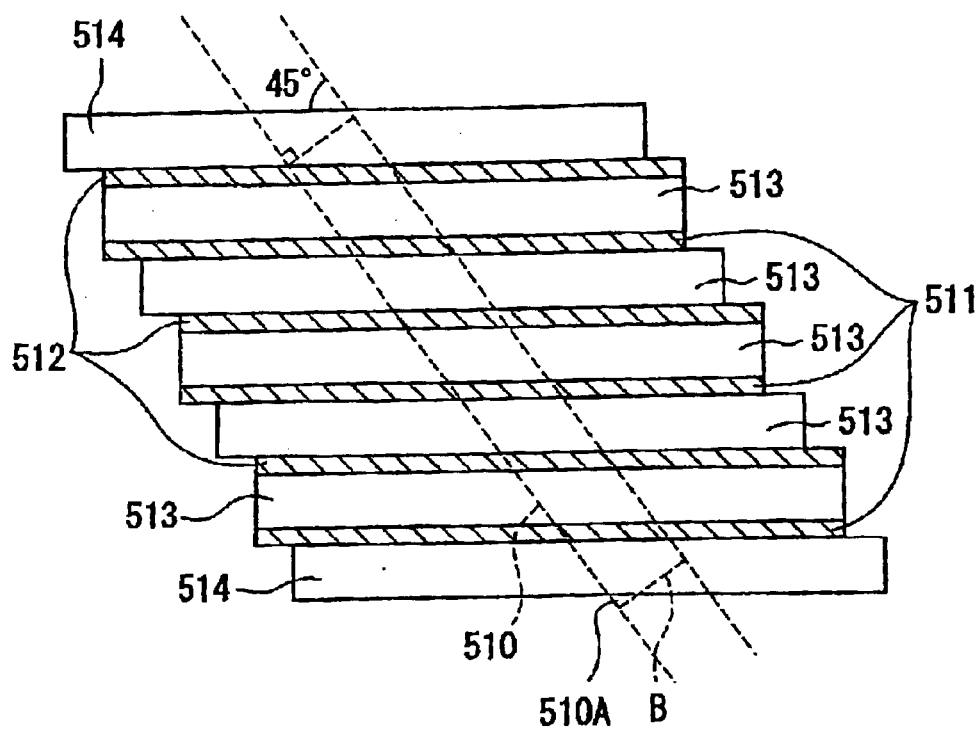
FIG. 16 is a schematic illustration showing production process of polarizing conversion elements of a second embodiment of the present invention.

Specifically, the polarizing conversion element 510 is formed as shown in FIG. 16.

As in the first embodiment, the sheet glass 513 having the polarization separating film 511 and the reflecting film 512 on both sides and the sheet glass 513 having no films are alternately bonded by an adhesive so that the polarization separating film 511 and the reflecting film 512 are alternately arranged. At this time, the sheet glass 514 having no polarization separating film 511 and the reflecting film 512 is located on the upper and lower sides of the bonded sheet glass 513.

The bonded sheet glass 513 are cut in parallel at forty-five degrees relative to the light-incident and light-irradiation surfaces thereof and protruded portions on both sides are cut to be shaped into approximately rectangular parallelepiped. At this time, as shown in cutting surface B illustrated in dotted line in FIG. 16, the bonded sheet glass 513 is cut so that a corner 510A is chipped on the protruded portion on which the polarization separating film is disposed.

Finally, the cutting surface is polished to construct the polarizing conversion element.

Figure 17:
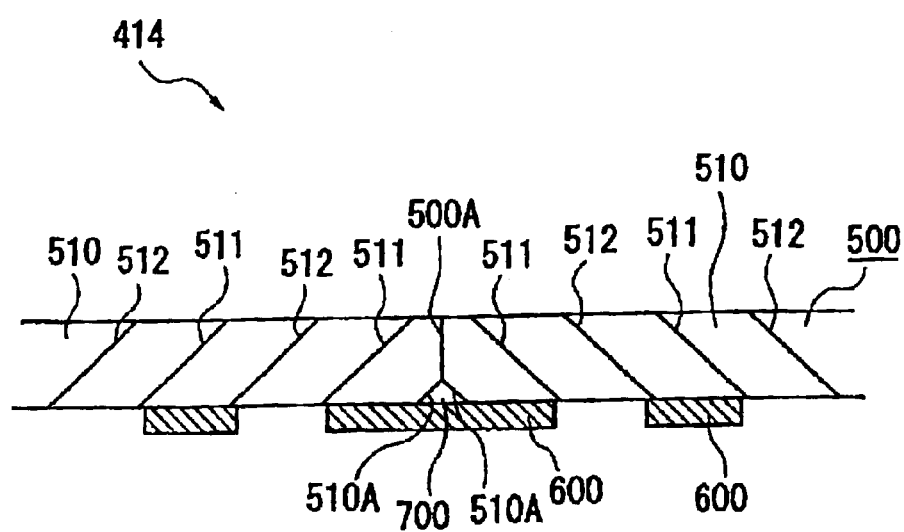
FIG. 17 is an illustration showing the polarization converter of the second embodiment seen from above.

FIG. 17 is a schematic illustration showing the polarization converter 414 seen from above.

As shown in FIG. 17, when the two polarizing conversion elements 510 are brought into close contact so that the respective polarization separating films 511 and the reflecting films 512 are opposed, the notch 700 is formed along the contact surface 500A between the retardation plate 600 attached to the light-irradiation side and the polarizing conversion element array 500.

Figure 18:
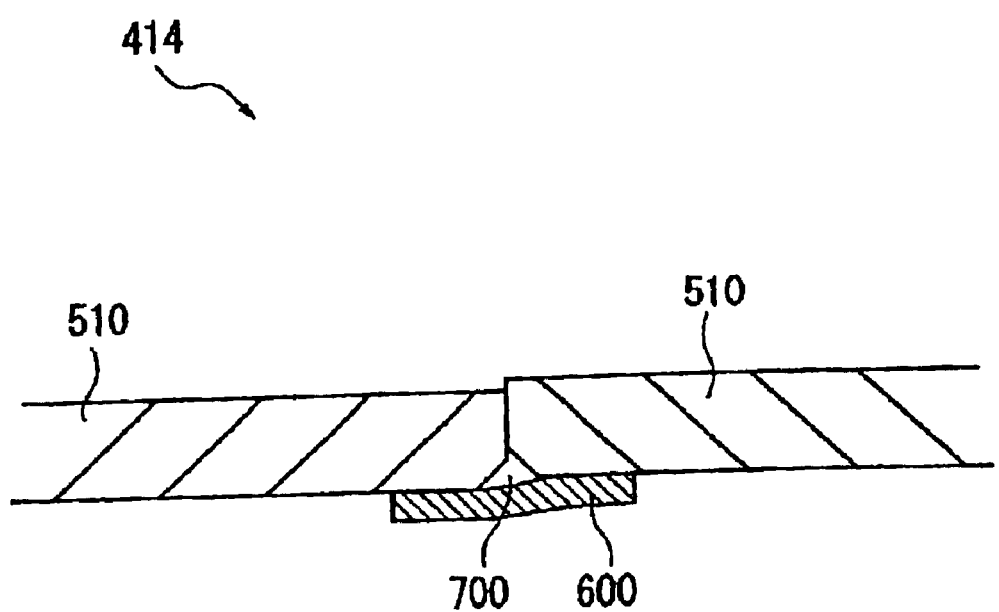
FIG. 18 is an illustration enlarging contact portion of the polarizing conversion elements of the second embodiment.

According to the arrangement of the polarizing conversion element 510, even when the two polarizing conversion elements 510 are not flush with each other, there is no bent portion on the retardation plate 600 by locating the bonding position of the retardation plate 600 remote from the two polarizing conversion elements 510, thus avoiding deterioration of transmissivity of the light beam on the illumination optical axis, as shown in FIG. 18.

According to the second embodiment, following advantages as well as the above advantages (1) to (6) and (8) can be obtained.

(9) Since the corner 510A of the polarizing conversion element 510 is chipped and the notch 700 is formed between the polarizing conversion element array 500 and the retardation plate 600 along the contact surface 500A, even when the two polarizing conversion elements 510 are not accurately positioned and a step is generated when contacting the polarizing conversion elements 510, the attachment accuracy of the retardation plate 600 can be ameliorated by the notch 700.

Accordingly, it is not necessary to attach the retardation plate 600 with high accuracy and the production efficiency can be improved for producing the polarization converter 414.

(10) Since a gap is formed between the retardation plate 600 and the polarizing conversion element array 500, even when a step is generated when the two polarizing conversion elements 510 are brought into close contact, the attachment position of the retardation plate 600 to the respective polarizing conversion elements 510 can be spaced apart, thereby preventing the retardation plate 600 from being bent by aligning with the step.

Accordingly, by eliminating the bent portion 600A of the retardation plate 600, deterioration of the transmissivity of the light beam can be prevented, thus avoiding deterioration in transmissivity of the light beam on the illumination optical axis having especially strong luminous energy among the light beam irradiated by the light source 411, thereby enhancing light utilization efficiency.

[6. Modification of Embodiments]

Incidentally, the scope of the present invention is not restricted to the aforesaid embodiments, but includes other arrangement as long as an object of the present invention can be achieved, which includes following modifications.

For instance, though the polarizing conversion element array 500 of the polarization converter 414 is constructed by closely contacting the two polarizing conversion elements 510 in the above embodiments, the two polarizing conversion elements 510 may be bonded by an adhesive etc.

The polarization separating films 511 may be connected approximately at ninety degrees when the two polarizing conversion elements 510 are brought into close contact with each other in the second embodiment.

Figure 19A:
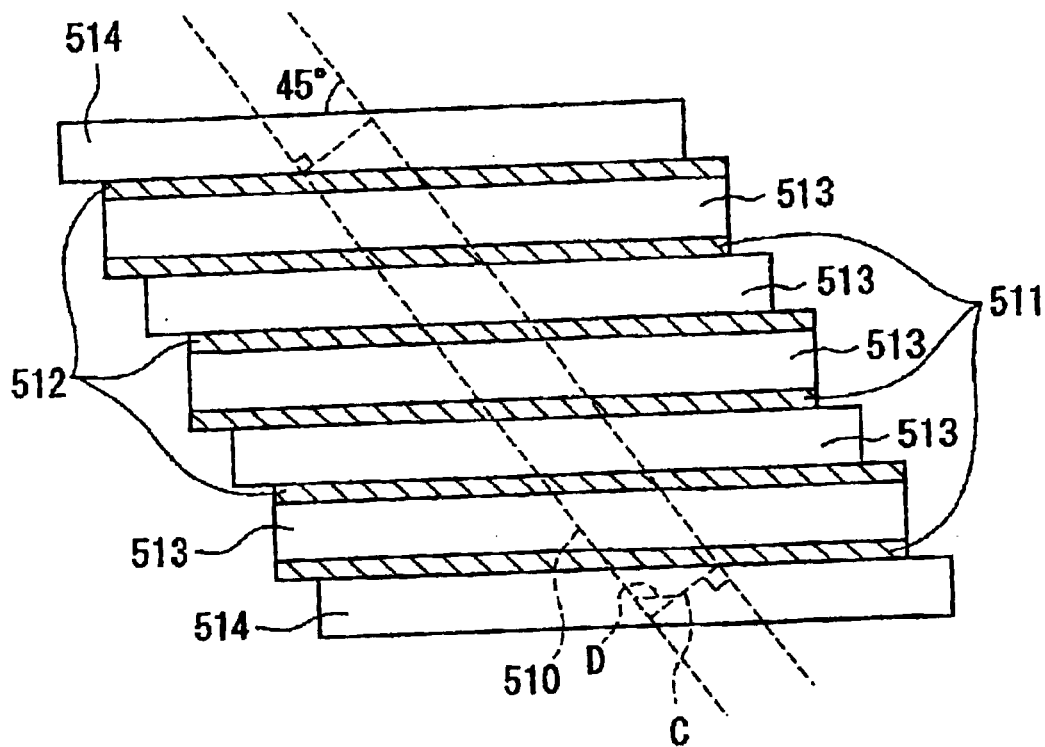
FIG. 19 is an illustration showing a modification of the aforesaid embodiments.
Figure 19B:
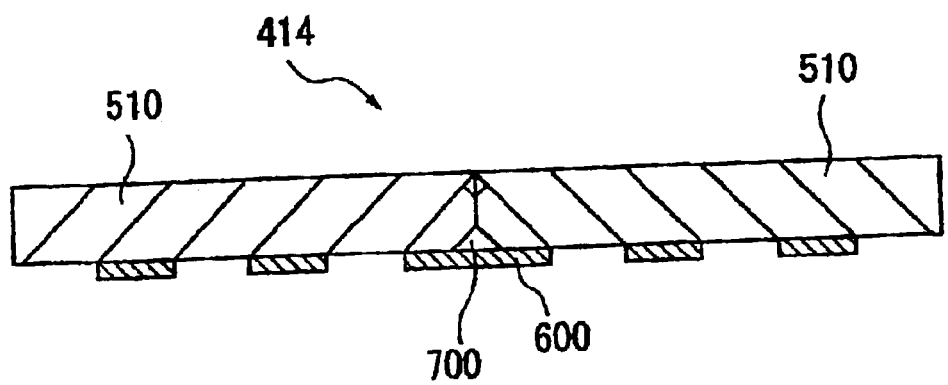

For instance, as shown in FIG. 19(A), the end of the polarization separating film 511 may be cut at a cutting surface C exposing the polarization separating film 511 on the corner in bringing the two polarizing conversion elements 510 into close contact, and the end on the light-irradiation side may be cut at a cutting surface D so that the polarization separating films 511 are connected approximately at ninety degrees when the two polarizing conversion elements 510 are brought into close contact, as shown in FIG. 19(B).

Figure 20:
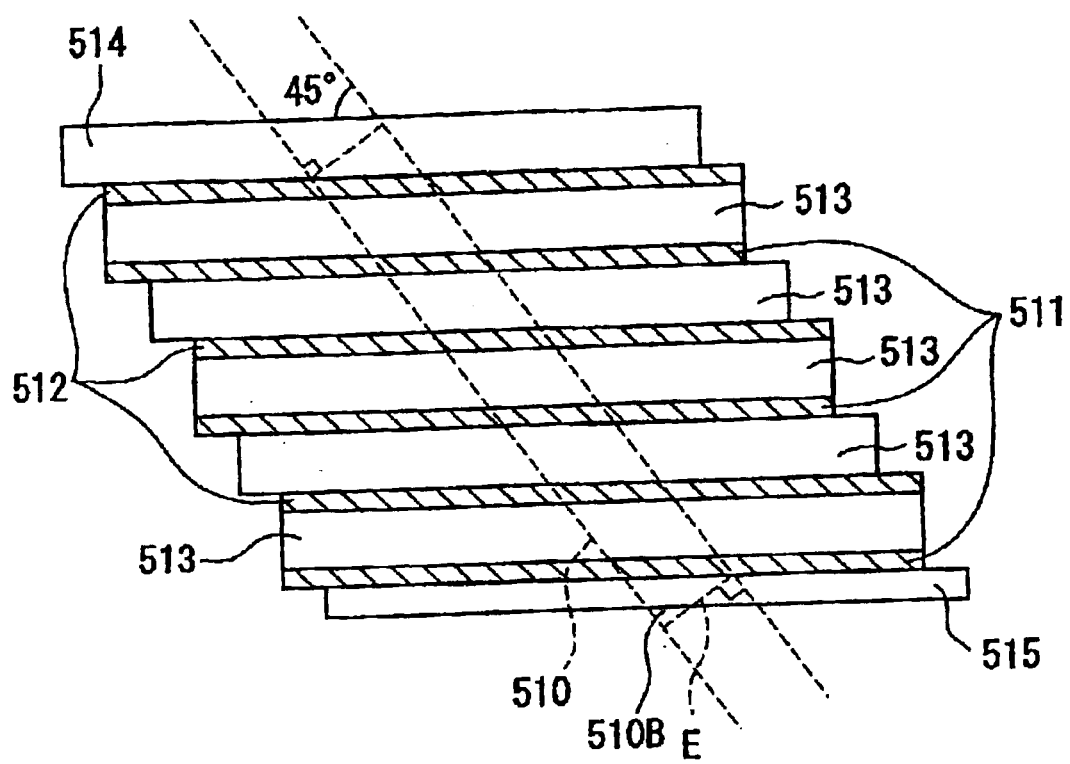
FIG. 20 is an illustration showing another modification of the aforesaid embodiments.

Alternatively, as shown in FIG. 20, a sheet glass 515 having different thickness may be bonded on the lower side of the bonded sheet glass 513 and the end on the side of the polarization separating film 511 may be cut at a cutting surface E exposing the polarization separating film 511 on the corner to chip the end of the corner 510B on the light-irradiation side.

Though the polarizing conversion element 510 is constructed by alternately bonding the sheet glass 513 having the polarization separating film 511 and the reflecting film 512 on both sides and the sheet glass 513 having no films, bonding the sheet glass 514 on the upper and lower sides thereof and cutting and polishing the bonded glasses in the above embodiments, such arrangement is not limiting. The polarizing conversion element 510 may be formed in any manner as long as the polarization separating film 511 and the reflecting film 512 are alternately arranged.

Though one of the corners 510A of the polarizing conversion element 510 is chipped and the two polarizing conversion elements 510 are brought into close contact so that the corners 510A are opposed in the second embodiment, the corner 510A of one of the polarizing conversion elements 510 may only be chipped so that the corner 510A is located on the contact surface of the two polarizing conversion elements 510.

Though a projector having three optical modulators is taken as an example in the above embodiment, the present invention may be applied to a projector having only one optical modulator, a projector having two optical modulators, or a projector having more than three optical modulators.

Though the liquid crystal panel is used as the optical modulator, an optical modulator such as a device using a micro-mirror may be used.

Though the transmissive optical modulator having different light-incident side and the light-irradiation side is used in the above embodiment, a reflective optical modulator having common light-incident and light-irradiation side may be used.

Though a front-type projector for projecting the image in a direction for observing a screen is taken as an example, the present invention may be applied to a rear-type projector where the image is projected on a side opposite to a side for observing a screen.

What is claimed is:

1. A polarization converter, comprising a pair of polarizing conversion element that are in close contact with each other, the polarizing conversion elements comprising:
    a plurality of polarization separating films inclined relative to incident light beam, the polarization separating films separating the incident light beam into two linearly polarization beams;
    a plurality of reflecting films alternately disposed in parallel between the polarization separating films, the plurality of reflecting films reflecting one of the linearly polarization beams separated by the polarization separating film;
    a light-transmissive member provided with the polarization separating film and the reflecting film; and
    a plurality of retardation plates provided on a light-irradiation side of the light- transmissive member, the retardation plates converting the polarization axis of the one of the polarization beams;
    wherein the polarizing conversion elements are combined so that the polarization separating films and the reflecting films of the polarizing conversion elements are symmetrically arranged around a contact surface of the polarizing conversion elements,
    wherein one of the plurality of the retardation plates provided on a position where the pair of polarizing conversion elements are in close contact stretches over the pair of polarizing conversion elements, and
    wherein a notch is formed on the light-irradiation side along the contact surface of the pair of polarizing conversion elements.

2. The polarization converter according to claim 1,
    wherein the contact surface of the pair of polarizing conversion elements is located so that the polarization separating films of the respective polarizing conversion elements continuously extend.

3. The polarization converter according to claim 1,
    wherein the polarization separating films and the refleting films are inclined approximately at forty-five degrees relative to light-incident direction and are alternately arranged at a predetermined interval.

4. An illumination optical device, comprising:
    a light source;
    a light splitting element that splits a ight beam from the light source into a plurality of areas; and
    a polarization converter, the polarization converter including a pair of polarizing conversion elements that are in close contact with each other, the polarizing conversion elements comprising:
    a plurality of polarizing separating films inclined relative to incident light beam, the polarizing separating films separating the incident light beam into two polarization beams;
    a plurality of reflecting films alternately disposed in parallel between the polarization separating films, the reflecting films reflecting one of the linearly polarization beams separated by the polarization separating film;
    a light-transmissive member provided with the polarization separating film and the reflecting film;
    and a plurality of retardation plated provided on a light-irradiation side of the light-transmissive member, the retardation plates converting the polarization axis of the one of the polarization beams; wherein the polarizing conversion elements are combined so that the polarization separating films and the reflecting films of the polarizing conversion elements are symmetrically arranged around a contact surface of the polarizing conversion elements, wherein one of the plurality of the retardation plates provided on a position where the pair of polarizing conversion elements are in close contact stretches over the pair of polarizing conversion elements, and wherein a notch is formed on the light-irradiation side along the contact surface of the pair of polarizing conversion elements.

5. A projectore, comprising:
    an illumination optical device having a light source; a light splitting element that splits a light beam from the light source into a plurality of areas; and a polarization converter, the polarization converter including a pair of polarizing conversion elements that are in close contact with each other, the polarizing conversion elements comprising:
    a plurality of polarization separating films inclined relative to incident light beam, the polarizing separating films separating the incident light beam into two linearly polarization beams;
    a plurality of reflecting films alternately disposed in parallel between the polarization separating films, the reflecting films reflecting one of the linearly polarization beams separated by the polarization separating film;
    a light-transmissive member proved with the polarization separating film and the reflecting film;
    a a plurality of retardatioin plates provided on a light-irradiation side of the light-transmissive member, the retardation plates converting the polarization axis of the one of the polarization beams;
    wherein the polarizing conversion elements are combind so that the polarization separating films and the reflecting films of the polarizing conversion elements are symmetrically arranged around a contact surface of the polarizing conversion elements, wherein one of the plurality of the retardation plates provided on a position where the pair of polarizing conversion elements are in close contact stretches over the pair of polarizing conversion elements, and wherein a notch is formed on the light-irradiation side along the contact surface of the pair of polarizing conversion elements;

a plurality of optical modulators that modulates the light beam irradiated by the illumination optical device in accordance with image information; and a color combining optical device that combines the light beam modulated by the plurality of optical modulators.

* * * * *